United States Patent [19]
Mark

[11] Patent Number: 4,490,504
[45] Date of Patent: Dec. 25, 1984

[54] FLAME RETARDANT NON-DRIPPING POLYCARBONATE COMPOSITIONS

[75] Inventor: Victor Mark, Evansville, Ind.

[73] Assignee: General Electric Company, Mt. Vernon, Ind.

[21] Appl. No.: 522,983

[22] Filed: Aug. 15, 1983

[51] Int. Cl.³ .............................................. C08K 3/40
[52] U.S. Cl. ..................................... 524/537; 524/611
[58] Field of Search ................ 524/611, 537; 528/176, 528/193, 204; 525/469

[56] References Cited

U.S. PATENT DOCUMENTS

| | | | |
|---|---|---|---|
| 3,577,378 | 5/1971 | Streib et al. | 524/611 |
| 4,098,754 | 7/1978 | Neuray et al. | 524/611 |
| 4,147,707 | 4/1979 | Alewelt et al. | 524/611 |
| 4,420,584 | 12/1983 | Rawlings et al. | 524/611 |
| 4,425,456 | 1/1984 | Baron et al. | 524/611 |
| 4,430,485 | 2/1984 | Mark | 528/204 |

FOREIGN PATENT DOCUMENTS

| | | | |
|---|---|---|---|
| 1096 | 3/1979 | European Pat. Off. | 525/469 |
| 46558 | 3/1982 | European Pat. Off. | 525/469 |
| WO82/00468 | 2/1982 | PCT Int'l Appl. . | |

Primary Examiner—Lewis T. Jacobs
Attorney, Agent, or Firm—Myron B. Kapustij; Martin B. Barancik

[57] ABSTRACT

Flame retardant and drip-retardant polycarbonate compositions exhibiting good thick section impact comprised of, in physical admixture:
(i) at least one halogen-free and sulfur-containing polycarbonate resin derived from (a) at least one halogen-free, sulfur-free and non-polycyclic dihydric phenol, (b) at least one halogen-free thiodiphenol, and (c) a carbonate precursor; and
(ii) fibrous glass.

These compositions contain an amount of said fibrous glass and an amount of said thiodiphenol effective to render said compositions flame retardant and drip retardant.

54 Claims, No Drawings

FLAME RETARDANT NON-DRIPPING POLYCARBONATE COMPOSITIONS

BACKGROUND OF THE INVENTION

Polycarbonates are well known thermoplastic materials which due to their many advantageous physical and mechanical properties find use as thermoplastic engineering materials in many commercial and industrial applications. The polycarbonates exhibit, for example, excellent properties of toughness, flexibility, impact resistance, and high heat distortion temperatures. The polycarbonates and their preparation are disclosed, inter-alia, in U.S. Pat. Nos. 2,964,974, 2,999,835, 3,028,365, 3,334,154, 3,275,601 and 3,915,926.

However, these polycarbonates generally suffer from two disadvantages. The first disadvantage is the low critical thickness values of polycarbonates, i.e. the thickness at which a discontinuity in Izod impact values occurs. These low critical thickness values tend to limit wall thickness of molded polycarbonate to a thickness below the critical thickness. Polycarbonates exhibit notched Izod impact values which are dependent on the thickness of the polycarbonates. Thus, for example, while typical notched Izod impact values of a one-eighth inch thick polycarbonate test specimen are generally in the range of about 16 foot pounds per inch, typical notched Izod impact values for a one-fourth inch thick polycarbonate test specimen are generally in the range of about 2 foot pounds per inch. The high Izod values of the one-eighth inch thick polycarbonate tests specimens are due to the fact that these specimens are thinner than the critical thicknes of the polymer and, therefore, upon impact a hinged or ductile break occurs. The low Izod impact values of the one-fourth inch thick polycarbonate test specimens are due to the fact that these specimens exceed the critical thickness of the polymer and, therefor, upon impact a clean or brittle break occurs.

The second disadvantage of polycarbonates is that they are somewhat flammable. Thus, polycarbonates are generally somewhat unsuitable for some applications where high temperatures and exposure to open flame may be encountered. In order to render polycarbonates suitable for use in these environments they must be modified to be rendered fire retardant. One of these modifications involves the inclusion of a halogenated moiety, such as a halogenated diphenol, in the carbonate polymer itself. These halogen containing carbonate copolymers are generally fire retardant. However, the presence of these halogen containing moieties adversely affects the already low critical thickness values of the polycarbonates. Thus, for example, the critical thickness of a carbonate copolymer containing 5 to 6 percent by weight bromine in the form of a brominated diphenol is typical about 130–140 mils.

The prior art, such as for example U.S. Pat. No. 4,043,980, discloses compositions obtained as the reaction product of an aromatic diol, a halogenated phenol, and a carbonic acid coreacted with an aromatic thiodiphenol, which compositions exhibit flame retardancy stated to be the result of synergism between the sulfur and the halogen present in the compositions. It is also stated that such compositions overcome the detrimental critical thickness effect. However, this prior art teaches the necessity of the presence of both a halogen containing moiety and a sulfur containing moiety in the carbonate polymer, and that the resultant flame retardancy of such halogen and sulfur containing copolycarbonates is the result of synergism between the sulfur and the halogen present in the copolycarbonate.

International Application No. WO 82/00468, published Feb. 18, 1982 discloses that polycarbonate compositions can be rendered fire retardant by either admixing with the carbonate polymer a polymer based on a thiodiphenol, or incorporating into the polycarbonate polymer itself a thiodiphenol residue. While these compositions are quite effective and useful in most applications, they suffer from the disadvantage that relatively large amounts of thiodiphenol, typically from about 23–98 mole percent, must be employed to render said compositions flame retardant and non-dripping. Since thiodiphenol is relatively expensive, as compared with dihydric phenols such as bisphenol-A normally used in the preparation of polycarbonates, its use in relatively large amounts places these flame retardant polycarbonate compositions at an economic disadvantage vis-a-vis the non-thiodiphenol containing polycarbonates. Also, in some applications, particularly those where the polycarbonate resin is required to exhibit properties of substantially sulfur-free bisphenol based polycarbonates, such as for example a bisphenol-A based polycarbonate, or where the presence of relatively large amounts of sulfur would be disadvantageous, such large amounts of thiodiphenol are undesirable. In these applications the prior art thiodiphenol containing polycarbonates could not be used satisfactorily.

It would thus be very advantageous if flame retardant polycarbonate compositions could be provided which are halogen-free and which consequently exhibit the properties of halogen-free polycarbonates, such as good thick section impact strengths. It would also be very advantageous if flame retardant polycarbonate compositions could be provided which not only exhibit he properties of halogen-free polycarbonates, but also exhibit the properties of substantially sulfur-free polycarbonates.

It is, therefore, one of the objects of the instant invention to provide polycarbonates which are flame retardant, are non-dripping, are halogen-free, and consequently exhibit the properties and characteristcs of halogen-free polycarbonates such as good thick section impact.

It is another object of the instant invention to provide polycarbonate compositions which are flame retardant and non-dripping while simultaneously exhibiting the properties and characteristics of substantially sulfur-free, or low sulfur containing, polycarbonate resins.

FIELD OF THE INVENTION

The instant invention is directed to fire retardant and substantially non-dripping polycarbonate compositions. More particularly the instant invention is directed to halogen-free, sulfur-containing polycarbonate compositions which are flame retardant and non-dripping.

SUMMARY OF THE INVENTION

Polycarbonate compositions are provided which exhibit good thick section impact, good critical thickness, and are simultaneously fire retardant and substantially non-dripping or drip-resistant. These flame retardant and non-dripping halogen-free polycarbonate compositions are comprised of, in admixture, (i) at least one polycarbonate resin derived from (a) a carbonate precursor, (b) at least one halogen-free, sulfur-free and non-polycyclic dihydric phenol, and (c) at least one halogen-free thiodiphenol; and (ii) fibrous glass.

DESCRIPTION OF THE INVENTION

It has been surprisingly discovered that polycarbonate compositions which are halogen-free can be provided which exhibit good thick section impact, good critical thickness, fire-retardancy, and non-dripping or drip-retardant properties. These halogen-free polycarbonate compositions are comprised of, in physical admixture, (i) at least one halogen-free and sulfur-containing polycarbonate resin derived from (a) at least one halogen-free, sulfur-free and non-polycylic dihydric phenol, (b) at least one halogen-free thiodiphenol, and (c) a carbonate precursor; and (ii) fibrous glass. The halogen-free thiodiphenol and the fibrous glass are present in amounts effective to render said compositions flame retardant and non-dripping.

By glass fibers, or fibrous glass, it is understood that glass silk, as well as all glass fiber materials derived therefrom including but not limited to glass fiber fabrics, roving, staple fibers, and glass fiber mats are included. The length of the glass filaments and whether or not they are bundled into fibers and the fibers bundled in turn to yarns, ropes, or rovings, or woven into mats and the like, are not critical to the instant invention. However, when using fibrous glass filaments, they may first be formed and gathered into a bundle known as a strand. In order to bind the filaments into a strand, a binder or binding agent is applied to the glass filaments. This facilitates the handling of the strands. Subsequently the strand can be chopped into various lengths as desired. It is convenient to use strands in lengths of from about $\frac{1}{4}"$ to about 1" long, preferably less than $\frac{1}{4}"$ in length. These are called chopped strands. Some of the binding agents utilized to bind the filaments into strands are polymers such as polyvinyl acetate, particular polyester resins, polycarbonates, starch, acrylic melamine, polyethylene oxide, and polyvinyl alcohol.

The polycarbonate compositions of the instant invention contain an amount of glass fibers and an amount of thiodiphenol effective to render said compositions fire retardant and non-dripping or drip-retardant. Generally, this amount of glass is in the range of from about 1 to about 50 weight percent, and preferably from about 5 to about 30 weight percent, based on the total amount of polycarbonate resin and glass present.

The halogen-free, sulfur-free and non-polycyclic dihydric phenols employed in the practice of the instant invention to produce the halogen-free polycarbonate resins may be represented by the general formula

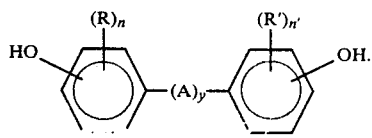

wherein:

A is selected from divalent hydrocarbon radicals, the —O— radical, and the

radical;

R is independently selected from monovalent hydrocarbon radicals, preferably those containing from 1 to about 12 carbon atoms;

R' is independently selected from monovalent hydrocarbon radicals, preferably those containing from 1 to about 12 carbon atoms;

n and n' are independently selected from whole numbers having a value of from 0 to 4 inclusive; and y has a value of either zero or one.

The divalent hydrocarbon radicals represented by A are selected from alkylene radicals containing from 2 to about 7 carbon atoms, alkylidene radicals containing from 1 to 7 carbon atoms, cycloalkylene radicals containing from 4 to about 7 carbon atoms in the cyclic structure, i.e. 4 to about 7 ring carbon atoms, and cycloalkylidene radicals containing from 4 to about 7 carbon atoms in the cyclic structure.

Some illustrative non-limiting examples of alkylene and alkylidene radicals represented by A include ethylene, propylene, isopropylene, ethylidene, propylidene, butylene, butylidene, isobutylene, neopentylene, and the like.

When A represents a cycloalkylene or cycloalkylidene radical these radicals may be represented by the general formula

wherein:

Cy is selected from cycloalkylene or cycloalkylidene radicals containing from 4 to about 7 carbon atoms in the cyclic structure;

$R^1$ is independently selected from lower alkyl radicals, preferably those containing from 1 to about 5 carbon atoms; and b is a whole number having a value of from 0 up to and including the number of replaceable hydrogen atoms present on Cy, preferably b has a value of from 0 to 6 inclusive.

Some illustrative, non-limiting examples of cycloalkylene and cycloalkylidene radicals represented by Formula II include cyclopentylene, cyclohexylene, cyclohexylidene, methylcyclohexylene, ethylcyclohexylidene, and the like.

The monovalent hydrocarbon radicals represented by R and R' are selected from alkyl radicals containing from 1 to about 8 carbon atoms, cycloalkylene radicals containing from 4 to about 7 carbon atoms in the cyclic structure, aryl radicals containing from 6 to 12 carbon atoms, aralkyl radicals containing from 7 to about 12 carbon atoms, and alkaryl radicals containing from 7 to about 12 carbon atoms.

Some illustrative non-limiting examples of alkyl radicals represented by R and R' include methyl, ethyl, propyl, isorpopyl, butyl, isobutyl, pentyl, neopentyl, hexyl, and heptyl.

The preferred aryl radicals represented by R and R' are phenyl and naphthyl.

Preferably, R and R' are selected from alkyl radicals.

In the dihydric phenol compounds of Formula I when more than one R substituent is present they may be the same or different. The same is true for the R' substituent. Where y is zero in Formula I the aromatic rings are directly joined with no intervening alkylene or other bridge. The positions of the hydroxyl groups and R or R' on the aromatic nuclear residues can be carried in the ortho, meta, or para positions and the groupings can be in a vicinal, asymmetrical or symmetrical relationship where two or more ring carbon atoms of the aromatic hydrocarbon residue are substituted with R or R' and hydroxyl groups.

The term "non-polycyclic" as used herein with respect to the instant dihydric phenols of Formula I is meant to specify that the divalent aliphatic hydrocarbon radicals bridging the two aromatic residues of the dihydric phenol, i.e. A and Cy, are non-polycyclic. That is to say, they are selected from non cyclic aliphatic radicals such as alkylene or alkylidene radicals, or monocyclic aliphatic radicals such as cycloalkylene or cycloalkylidene radicals. Thus, the non-polycyclic dihydric phenols of Formula I do not include, by definition, those polycyclic dihydric phenols where the bridging group connecting the two aromatic residues is polycyclic, e.g. a bicyclic, bridged, or fused hydrocarbon multi ring structure such as the 2-nornornylidene, or bicyclo(3,3,0) octylene rings.

The dihydric phenols of Formula I are well known to those skilled in the art. Some illustrative non-limiting examples of the dihydric phenols of Formula I include:
2,2-bis(4-hydroxyphenyl)propane (bisphenol-A);
2,4'-dihydroxydiphenylmethane;
bis(2-hydroxyphenyl)methane;
bis(4-hydroxyphenyl)methane;
1,1-bis(4-hydroxyphenyl)ethane;
1,3-bis(3-methyl-4-hydroxyphenyl)propane;
2,2-bis(3,5-dimethyl-4-hydroxyphenyl)propane;
2,2-bis(3-isopropyl-4-hydroxyphenyl)propane;
1,1-bis(4-hydroxyphenyl)cyclohexane;
1,1-bis(3,5-dimethyl-4-hydroxyphenyl)cyclohexane;
bis(3-ethyl-4-hydroxyphenyl)ether;
bis(4-hydroxyphenyl)ether;
3,3'-dimethyl-4,4'-dihydroxydiphenyl; and
bis(4-hydroxyphenyl)cyclohexylmethane.

The preferred dihydric phenols of Formula I, for the purposes of the instant invention, are the 4,4'-bisphenols.

A particularly useful dihydric phenol is 2,2-bis(4-hydroxyphenyl)propane, also known as bisphenol-A.

It is, of course, possible to employ mixtures of two or more different dihydric phenols of Formula I in the practice of the instant invention. Therefore, whenever the term dihydric phenol is used herein it is to be understood that this term encompasses mixtures of dihydric phenols as well as indivdiual dihydric phenols.

The halogen-free thiodiphenols useful in the practice of this invention are those represented by the general formula

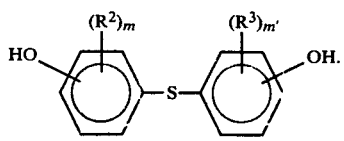

III wherein:
$R^2$ is independently selected from monovalent hydrocarbon radicals;
$R^3$ is independently selected from monovalent hydrocarbon radicals; and
m amd m' are independently selected from whole numbers having a value of from 0 to 4 inclusive.

The monovalent hydrocarbon radicals represented by $R^2$ and $R^3$ are selected from alkyl, aryl, alkaryl, and aralkyl radicals.

Preferred alkyl radicals represented by $R^2$ and $R^3$ are those containing from 1 to about 8 carbon atoms.

Preferred aryl radicals represented by $R^2$ and $R^3$ are those containing from 6 to 12 carbon atoms.

Preferred aralkyl and alkaryl radicals represented by $R^2$ and $R^3$ are those containing from 7 to about 15 carbon atoms, e.g., benzyl, ethylphenyl, propylphenyl, methylnaphthyl, and the like.

Preferred halogen-free thiodiphenols of Formula III are those wherein $R^2$ and $R^3$ are independently selected from alkyl radicals, preferably those alkyl radicals containing from 1 to about 8 carbon atoms, e.g., methyl, ethyl, propyl, isopropyl, butyl, isobutyl, tertiarybutyl, pentyl, neopentyl, and the like.

In the thiodiphenol compounds of Formula III when more than one $R^2$ substituent is present they may be the same or different. The same is true for the $R^3$ substituent. The position of $R^2$ or $R^3$ and the hydroxyl groups on the aromatic nuclear residues can be varied in the ortho, meta, or para positions and the groupings can be in a vicinal, asymmetrical or symmetrical relationship, where two or more ring carbon atoms of the aromatic hydrocarbon residue are substituted with $R^2$ or $R^3$ and hydroxyl groups.

Some illustrative non-limiting examples of the preferred halogen-free thiodiphenols of Formula III include:
4,4'-thiodiphenol;
2-methyl-4,4'-thiodiphenol;
2,2'-dimethyl-4,4'-thiodiphenol;
2,2-di-tertiarybutyl-4,4'-thiodiphenol;
2,2',3,3',5,5 $\propto$, 6,6'-octamethyl-4-4'-thiodiphenol;
2,2'-diethyl-4,4'-thiodiphenol;
2,2',3,3',6,6'-hexamethyl-4,4'-thiodiphenol;
2-methyl-6-propyl-4,4'-thiodiphenol;
2,6-dimethyl-4,4'-thiodiphenol;
2,3,5,6-tetrapropyl-4,4'-thiodiphenol.

The 4,4'-thiodiphenols have been found to be particularly useful. Particularly useful 4,4'-thiodiphenols are the 2,2',6,6'-tetraalkyl-4,4'-thiodiphenols such as, for example, 2,2',6,6'-tetramethyl-4,4'-thiodiphenol, 2,2',6,6'-tetraethyl-4,4'-thiodiphenol, 2,2'-dimethyl,6,6'-diethyl-4,4'-thiodiphenol, and the like.

Some of these thiodiphenols may be prepared by known methods such as those described, for example, in U.S. Pat. No. 3,931,335, which is hereby incorporated by reference.

It is, of course, possible to employ mixtures of two or more different thiodiphenols of Formula III in the practice of the instant invention. Therefore, whenever the term halogen-free thiodiphenol is used herein it is to be understood that this term encompasses mixtures of two or more different thiodiphenols of Formula III as well as individual halogen-free thiodiphenols.

The amount of thiodiphenol of Formula III employed in the preparation of the halogen-free carbonate polymers of the instant invention is an amount effective to render the instant compositions flame retardant. Generally, this amount is in the range of from about 1 to about 15 mole percent, based on the total amount of dihydric phenol of Formula I and thiodiphenol of Formula III present, and preferably from about 2 to about 10 mole percent. Generally, if less than about 1 mole percent of thiodiphenol of Formula III is employed, the resultant compositions will not exhibit, to any significant degree, flame retardance. If more than about 15 mole percent of the thiodiphenol of Formula III is employed the resultant compositions will begin to exhibit the properties of sulfur containing polycarbonates and will not be economically competitive with non-thiodiphenol containing polycarbonates. That is to say, compositions containing more than about 15 mole % of the thiodiphenol residues will not exhibit the substantially sulfur-free characteristics of the instant polycarbonates, and will not be economically competitive with non-thiodiphenol containing polycarbonates which have been rendered flame retardant by the addition of relatively cheap halogen containing moieties thereto.

The carbonate precursor may be a carbonyl halide, a bishaloformate, or a diarylcarbonate. The carbonyl halides include carbonyl bromide, carbonyl chloride, and mixtures thereof. The bishaloformates include the bishaloformates of dihydric phenols such as bischloroformates of 2,2-bis(4-hydroxyphenyl)propane, 2,2-bis(4-hydroxy-3,5-dimethylphenyl)propane, hydroquinone, and the like; or the bishaloformates of glycols such as the bischloroformates of ethylene glycol, neopentyl glycol, polyethylene glycol, and the like. Typical of the diarylcarbonates which may be employed are diphenyl carbonate and the di(alkylphenyl) carbonates such as di(tolyl)carbonate. Some other non-limiting illustrative examples of suitable diarylcarbonates include di(naphthyl) carbonate, phenyl tolyl carbonate, and the like.

The preferred carbonate precursors are the carbonyl halides, with carbonyl chloride, also known as phosgene, being the preferred carbonyl halide.

Also included within the scope of the instant invention are the high molecular weight thermoplastic randomly branched polycarbonates. These randomly branched polycarbonates are prepared by coreacting a minor amount of a polyfunctional organic compound with the dihydric phenol of Formula I and the thiodiphenol of Formula III. The polyfunctional organic compounds useful in making the branched polycarbonates are disclosed, inter alia, in U.S. Pat. Nos. 3,635,895 and 4,001,184. These polyfunctional compounds are generally aromatic and may contain at least three functional groups which may be carboxyl, hydroxyl, carboxylic anhydride, haloformyl, or mixtures thereof. Some illustrative non-limiting examples of these polyfunctional organic compounds include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, and benzophenonetetracarboxylic acid anhydride.

One method which may be utilized in preparing the polycarbonates of the instant invention involves the heterogeneous interfacial polymerization system utilizing an aqueous solution, an organic water immiscible solvent, at least one dihydric phenol of Formula I, at least one thiodiphenol of Formula III, a carbonate percursor, a catalyst, and a molecular weight regulator. A preferred heterogeneous interfacial polymerization system is one which utilizes phosgene as the carbonate precursor.

Another useful method for preparing the carbonate polymers of the instant invention involves the use of an organic solvent system wherein the organic solvent system may also function as an acid acceptor, at least one dihydric phenol of Formula I, at least one thiodiphenol of Formula III, a molecular weight regulator, and a carbonate precursor. A preferred method is one wherein phosgene is utilized as the carbonate precursor.

Generally, in both of the aforedescribed methods phosgene is passed into a reaction mixture containing at least one halogen-free, sulfur-free and non-polycyclic dihydric phenol of Formula I and at least one halogen-free thiodiphenol of Formula III. The temperature at which the phosgenation reaction proceeds vary from below 0° C. to above 100° C. The reaction proceeds satisfactorily at temperatures from room temperature (25° C.) to about 50° C. Since the reaction is exothermic, the rate of phosgene addition may be used to control the reaction temperature.

A suitable acid acceptor may be either organic or inorganic in nature. A suitable organic acid acceptor is a tertiary amine and includes such materials as pyridine, triethylamine, dimethylaniline, tributylamine, etc. The inorganic acid acceptor may be a hydroxide, such as an alkali or alkaline earth metal hydroxide, a carbonate, a bicarbonate, a phosphate, and the like. An inorganic acid acceptor is preferred when an aqueous solvent system is utilized.

The catalysts which may be employed herein can be any of the well known catalysts which aid the polymerization reaction of the dihydric phenol and the thiodiphenol with phosgene. Suitable catalysts include, but are not limited to, tertiary amines, secondary amines, quaternary ammonium compounds, quaternary phosphonium compounds, amidines, and the like.

The molecular weight regulators employed may be any of the known compounds which regulate the molecular weight of the carbonate polymers by a chain stopping or terminating mechanism. These compounds include, but are not limited to, phenol, tertiarybutyl phenol, and the like.

The high molecular weight aromatic carbonate polymers of the instant invention generally have a weight average molecular weight in the range of from about 5,000 to about 200,000, preferably from about 10,000 to about 100,000, and more preferably from about 25,000 to about 50,000.

The polycarbonates of the instant invention, in addition to having admixed therewith the glass fibers, may also optionally have admixed therewith certainly commonly known and used additives such as, for example, antioxidants; antistatic agents; inert fillers such as clay, mica, talc; ultraviolet radiation absorbers such as the benzophenones, benzotriazoles, benzylidene malonates, and the like; hydrolytic stabilizers such as the epoxides disclosed in U.S. Pat. Nos. 3,489,716, 4,138,379 and 3,839,247, all of which are incorporated herein by reference; mold release agents; color stabilizers such as the organophosphites disclosed in U.S. Pat. Nos. 3,305,520 and 4,118,370, both of which are incorporated herein by reference; and the like.

The carbonate polymers of the instant invention will generally contain the following repeating structural units:

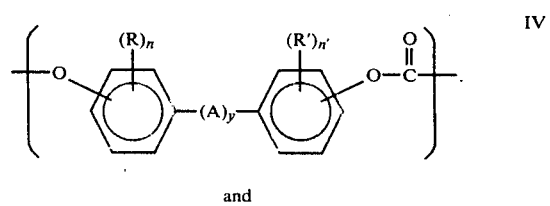

IV and

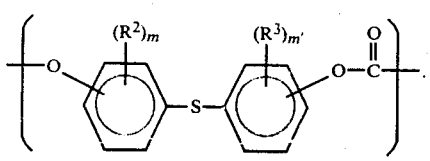

wherein R, R', $R^2$, $R^3$, A, y, n, n', m and m' are as defined hereinafore.

The structural units of Formula V will be present in minor amounts. More specifically, the polycarbonate resin will contain from 1 to about 15 mole percent, and preferably from 2 to about 10 mole % of structural units of Formula V, based on the total amount of structural units of Formula IV and V present.

Another embodiment of the instant invention is a composition containing a polycarbonate resin blend and fibrous glass. This composition contains, in admixture:

(i) at least one halogen-free and sulfur-containing polycarbonate resin of the type described above, i.e., one derived from (a) at least one halogen-free, sulfur-free and non-polycyclic dihydric phenol of Formula I, (b) at least one halogen-free thiodiphenol of Formula III, and (c) a carbonate precursor (hereinafter referred to as resin A);

(ii) at least one halogen-free and sulfur-free polycarbonate resin derived from (a) at least one halogen-free, sulfur-free and non-polycyclic dihydric phenol such as that of Formula I, and (b) a carbonate precursor (hereinafter referred to as resin B); and (iii) fibrous glass.

When the compositions of the instant invention contain blends of resins A and B the amount of the structural units of Formula V present in resin A may be increased above the 15 mole % limit specified above, providing that the amount of structural units of Formula V present in the blends, i.e., the blends of resins A and B, is in the range of from about 1 to about 15 mole %, and preferably from about 2 to about 10 mole %, based on the total amount of structural units of Formulae IV and V present in resins A and B.

Thus, for example, resin A may contain 30 mole percent of structural units of Formula V. This resin A is then blended with Polymer B which contains only structural units of Formula IV. The final blend contains amounts of resin A and resin B such that the mole % of structural units of Formula V present in the blend, based on the total amount of structural units of Formulae IV and V present in resin A and structural units of Formula IV present in resin B, is in the range of from about 1 to about 15 mole %. Thus if resin A of this illustration is blended with resin B in a 1:1 mole ratio the blend will contain 15 mole % of structural units of Formula V.

Generally, if the compositions containing the blends of at least one polycarbonate resin A and at least one polycarbonate resin B contain less than about 1 mole % of the structural units of Formula V there will be no appreciable improvements in their flame retardancy. If, on the other hand, the compositions contain more than about 15 mole % of structural units of Formula V, the compositions will begin to be economically adversely affected, and the concentration of sulfur in these compositions will begin to approach levels which will begin to render these compositions unsuitable for applications where the presence of sulfur in polycarbonate resins is undesirable, or where polycarbonates exhibiting the characteristics of substantially sulfur-free polycarbonate resins, such as those based on bisphenol-A, are required.

These polycarbonate blend compositions contain the fibrous glass in amounts of from about 1 to about 50 weight percent, and preferably from about 5 to about 30 weight percent, based on the total amounts of polycarbonate resins A and B, and glass present.

Generally, these blended compositions contain from about 20 to about 80 mole percent of resin A and from about 80 to about 20 mole percent of resin B. These blends may be conventionally prepared by simply physically admixing these two polycarbonate resins together, either as powders, or by extruding the individual resins into strands, chopping the strands into pellets, and then mixing the pellets together.

These compositions may also optionally contain the various aforedescribed additives.

Yet another embodiment of the instant invention is a flame retardant non-dripping or drip-retardant copolyester-carbonate composition comprised of, in admixture:

(i) at least one halogen-free copolyester-carbonate resin derived from (a) at least one halogen-free, sulfur-free and non-polycylic dihydric phenol of Formula I, (b) at least one halogen-free thidoiphenol of Formula III, (c) a carbonate precursor, and (d) at least one difunctional carboxylic acid or a reactive derivative thereof; and (ii) glass fibers.

Copolyester-carbonates, and the method of their preparation, are known in the art and are described, for example, in U.S. Pat. No. 3,169,121, which is hereby incorporated herein by reference. Briefly stated, the copolyester-carbonate resins of this invention comprise recurring carbonate groups

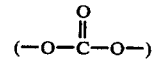

carboxylate groups

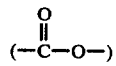

and aromatic carbocyclic groups in the linear polymer chain, in which at least some of the carboxylate groups and at least some of the carbonate groups are bonded directly to ring carbon atoms of the aromatic carbocyclic groups.

These copolyester-carbonate polymers contain ester bonds and carbonate bonds in the polymer chain, wherein the amount of ester bonds is from about 25 to about 90 mole percent, preferably from about 35 to about 80 mole percent, relative to the carbonate bonds. For example, 5 moles of bisphenol-A reacting completely with 4 moles of isophthaloyl dichloride and 1 mole of phosgene would give a copolyester-carbonate of 80 mole percent ester bonds.

The copolyester-carbonates of the instant invention, which are halogen-free, are prepared by coraecting (a) at least one halogen-free, sulfur-free and non-polycyclic dihydric phenol of Formula I, (b) at least one halogen-free thiodiphenol of Formula III, (c) a carbonate precursor, and (d) at least one difunctional carboxylic acid or a reactive derivative thereof.

These copolyester-carbonate compositions contain an amount of fibrous glass and an amount of thiodiphenol effective to render said compositions flame retardant and substantially non-dripping or drip-retardant. Generally, this amount of glass is in the range of from about 1 to about 50 weight percent, and preferably from about 5 to about 30 weight percent, based on the total amount of copolyester-carbonate resin and glass present. The amount of thiodiphenol employed is from about 1 to about 15 mole %, and preferably from about 2 to about 10 mole %, based on the total amount of dihydric phenol and thiodiphenol employed.

In general, any difunctional carboxylic acid conventionally used in the preparation of linear polyesters may be utilized in the preparation of the copolyester-carbonates of the instant invention. Generally, the difunctional carboxylic acids which may be used include the aliphatic carboxylic acids, the aromatic carboxylic acids, and the aliphatic-aromatic carboxylic acids. These acids are disclosed in U.S. Pat. No. 3,169,121, which is hereby incorporated herein by reference.

The difunctional carboxylic acids which may be used generally will conform to the general formula VI. 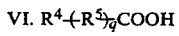

wherein $R^5$ is an alkylene, alkylidene or cycloalihatic group; an alkylene, alkylidene or cycloaliphatic group containing ethylenic unsaturation; an aromatic group such as phenylene, biphenylene, substituted phenylene, and the like; two or more aromatic groups connected through non-aromatic linkages such as alkylene or alkylidene groups; and a divalent aralkyl radical such as tolylene, xylelene, and the like. $R^4$ is either a carboxyl or a hydroxyl group. The letter q represents one where $R^4$ is a hydroxyl group and either one or zero where $R^4$ is a carboxyl group.

Preferred difunctional carboxylic acids are the aromatic difunctional carboxylic acids, i.e., those acids of Formula VI wherein $R^5$ represents an aromatic radical and q is one. The preferred aromatic difunctional carboxylic acids are those represented by the general formula

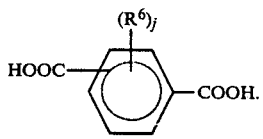

wherein $R^6$ is independently selected from alkyl groups, preferably those containing from 1 to about 8 carbon atoms, and j is a whole number having a value of from 0 to 4 inclusive.

Mixtures of these carboxylic acids may be employed, and where the term difunctional carboxylic acid is used herein it is to be understood that this term includes mixtures of two or more different difunctional carboxylic acids as well as individual difunctional carboxylic acids.

Particularly useful carboxylic acids are isophthalic acid, terephthalic acid, and mixtures thereof. A particularly useful aromatic dicarboxylic acid comprises a mixture of isophthalic acid and terephthalic acid wherein the weight ratio of terephthalic acid to isophthalic acid is in the range of from about 9:1 to about 0.2:9.8.

Rather than utilizing the difunctional carboxylic acids per se, it is possible, and sometimes even preferred, to employ the reactive derivatives of said acids. Illustrative of these reactive derivatives are the acid halides, such as the diacid halides. The preferred diacid halides are the diacid chlorides. Thus, for example, instead of employing isophthalic or terephthalic acid, terephthaloyl dichloride or isophthaloyl dichloride may be employed.

The copolyester-carbonates of the present invention may be prepared by known processes such as interfacial polymerization or phase boundary separation, transesterification, solution polymerization, melt polymerization, interesterification, and the like. Various prior art polymerization processes are disclosed in U.S. Pat. Nos. 3,030,311; 3,169,121; 3,207,184 and 4,188,314, all of which are hereby incorporated herein by reference. Although the processes may vary, several of the preferred processes typically include dissolving or dispersing the reactants in a suitable water immiscible solvent medium and contacting the reactants with a carbonate precursor, such as phosgene, in the presence of a suitable catalyst and an aqueous caustic solution under controlled pH conditions. A molecular weight regulator, that is, a chain stopper, is generally added to the reactants prior to or during contacting them with a carbonate precursor.

Also included herein are branched copolyester-carbonates wherein a polyfunctional compound of the type described hereinafore is a coreactant with the dihydric phenol of Formula I, the thiodiphenol of Formula III in the reaction mixture, containing also the carbonate precursor and the difunctional carboxylic acid or a reactive derivative thereof, to provide a thermoplastic randomly branched copolyester-carbonate. The proportion of carboxylate and carbonate groups present in the final polymer can be suitably varied by varying the molar ratio of the dihydric phenol and thiodiphenol to difunctional carboxylic acid or reactive derivative thereof.

The copolyester-carbonate resins of the instant invention will generally contain, when a dicarboxylic acid or a reactive derivative thereof is employed, the following repeating structural units:

units of Formula IV;
units of Formula V;

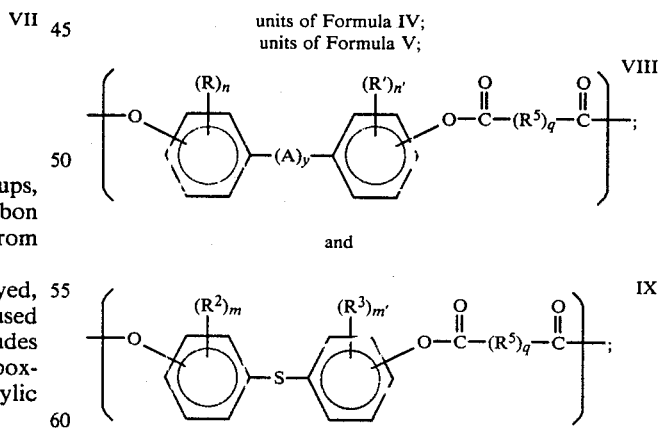

wherein R, R', $R^2$, $R^3$, $R^5$, A, y, n, n', m, m' and q are as defined hereinafore.

Structural units of Formulae V and IX are present in minor amounts, i.e. the copolyester-carbonate resins of the instant invention will contain from about 1 to about 15, and preferably from about 2 to about 10 mole percent of structural units V and IX combined based on the total amount of structural units of Formulae IV, V, VIII and IX present.

Generally, if the copolyester-carbonates of the instant invention contain less than about 1 mole % of structural units of Formulae V and IX, there will be no significant improvement in the flame retardancy of these copolyester-carbonate resins. If, on the other hand, they contain more than about 15 mole % of the structural units of Formulae V and IX combined, they will begin to loose their economic competitiveness with copolyester-carbonates which do not contain these thiodiphenol based structural units. Furthermore, these copolyester-carbonate resins will begin to exhibit properties of sulfur-containing copolyester-carbonate resins. That is to say, copolyester-carbonate resins containing more than about 15 mole % of the structural units of Formulae V and IX will not exhibit the substantially sulfur-free characteristics of the instant copolyester-carbonates, and will not be economically competitive with copolyester-carbonate resins which do not contain any thiodiphenol residues but which have been rendered flame retardant by means of a relatively less expensive halogen containing moiety.

The instant copolyester-carbonate resin compositions may also optionally contain the various known and commonly used additives described hereinafore such as, for example, antioxidants, inert fillers, mold release agents, hydrolytic stabilizers, color stabilizers, and ultraviolet radiation stabilizers.

Still another embodiment of the instant invention is a composition containing a blend of copolyester-carbonate resins and fibrous glass. This composition contains, in physical admixture:

(i) at least one halogen-free and sulfur-containing copolyester-carbonate resin of the type described supra, i.e. one derived from (a) at least one halogen-free, sulfur-free and non-polycyclic dihydric phenol of Formula I, (b) at least one halogen-free thiodiphenol of Formula III, (c) a carbonate precursor, and (d) at least one difunctional carboxylic acid or a reactive derivative thereof (hereinafter referred to as copolyester-carbonate resin C);

(ii) at least one halogen-free and sulfur-free copolyester-carbonate resin derived from (a) at least one halogen-free, sulfur-free and non-polycyclic dihydric phenol of Formula I, (b) a carbonate precursor, and (c) at least one difunctional carboxylic acid or a reactive derivative thereof (hereinafter referred to as copolyester-carbonate resin D); and (iii) fibrous glass.

When the compositions of this embodiment contain blends of resins C and D the amount of the structural units of Formulae V and IX present in resin C may be increased above the 15 mole % upper limit specified supra, providing that the amount of structural units of Formulae V and IX present in the blends is in the range of from about 1 to about 15 mole %, and preferably from about 2 to about 10 mole %, based on the total amount of structural units of Formulae IV, V, VIII and IX present in resins C and D.

The compositions containing the blends of at least one resin C and at least one resin D contain an amount of glass and an amount of thiodiphenol residue, present in resin C as the structural units of Formulae V and IX, effective to render said compositions flame-retardant and substantially non-dripping or drip-retardant. Generally, this amount of glass is in the range of from about 1 to about 50 weight percent, and preferably from bout 5 to about 30 weight percent, based on the total amounts of resins C and D, and glass fibers present. The amount of thiodiphenol employed to form the instant compositions is from 1 to about 15, and preferably from about 2 to about 10 mole percent, based on the total amount of thiodiphenol and dihydric phenol utilized to produce both resin C and resin D.

Generally the compositions of this embodiment contain from about 20 to about 80 mole percent of resin C and from about 80 to about 20 mole percent of resin D, based on the total amount of resins C and D present in these compositions.

These blended compositions may be prepared by any conventional means, such as by admixing the two resins C and D in powder form; or by extruding each of the resins individually into strands, chopping the strands into pellets, and then physically mixing or blending the pellets.

The compositions containing the blends of resins C and D may also optionally have admixed therewith the commonly used and known additives described supra.

PREFERRED EMBODIMENT OF THE INVENTION

The following examples are presented to more fully and clearly illustrate the invention. Although the examples set forth the best mode presently known to practice the invention they are intended to be an should be considered as illustrative rather than limiting the invention. In the examples all parts and percentages are by weight unless otherwise specified.

The following examples illustrate polycarbonate compositions falling outside the scope of the instant invention and are presentd for comparative purposes only.

EXAMPLE 1

This example illustrates a prior art copolycarbonate which is derived from bisphenol-A and 4,4'-thiodiphenol. This polycarbonate contains no glass fibers.

Into a mixture of 2283 grams of bisphenol-A (10 moles), 218 grams (1 mole) of 4,4'-thiodiphenol, 5700 grams of water, 9275 grams of methylene chloride, 32 grams of phenol and 10 grams of triethylamine are introduced, at ambient temperature, 1180 grams of phosgene over a period of 97 minutes while maintaining the pH of the two phase system at about 11, i.e. pH 10–12.5, by simultaneously adding an aqueous 25% sodium hydroxide solution. At the end of the phosgene addition period the pH of the aqueous phase is 11.7 and the bisphenol-A content of this phase is less than about 1 part per million as determined by ultraviolet analysis.

The methylene chloride phase is separated from the aqueous phase, washed with an excess of dilute (0.01N) aqueous HCl and then washed three times with deionized water. The polymer is precipitated by steam and dried at 95° C. The resultant polycarbonate is fed to an extruder, which extruder is operated at about 500° F. and the extrudate is comminuted into pellets.

The pellets are then injection molded at about 600° F. into test bars of about $5'' \times \frac{1}{2}'' \times \frac{1}{8}''$ thick. These test bars are subjected to the test procedure set forth in underwriters' Laboratories Inc., Bulletin UL-94, Burning Test for Classified Materials. In accordance with this test procedure, materials that pass are rated V-O, V-I or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of the invention, as "burns". Further, U.L-94 requires that all test bars in each test group must meet the V-type rating to achieve the particular classification. Otherwise, the 5 test bars receive the rating of the worst single bar. For example, if one bar is classified as V-II and the other four are classified as V-O, then the rating for all 5 bars is V-II.

EXAMPLE 2

This example also illustrates a prior art copolycarbonate which is derived from bisphenol-A and thiodiphenol. This polycarbonate has no glass fibers admixed therewith.

The procedure of Example 1 is substantially repeated using a mixture of 1712.5 grams (7.5 moles) of bisphenol-A and 545.7 grams (2.5 moles) of 4,4'-thiodiphenol.

Test bars are prepared substantially in accordance with the procedure of Example 1 and these test bars are subjected to test procedure UL-94.

EXAMPLE 3

This example illustrates a prior art polycarbonate which contains no thiodiphenol and has no glass fibers admixed therewith.

Into a mixture of 2283 grams of pure bisphenol-A, 5700 grams of water, 9275 grams methylene chloride, 32 grams phenol and 10 grams triethylamine are introduced, at ambient temperature 1180 grams of phosgene over a period of 97 minutes while maintaining the pH of the two phase system at about 11, i.e. 10–12.5, by simultaneously adding an aqueous 25% sodium hydroxide solution. At the end of the addition period, the pH of the aqueous phase is 11.7 and the bisphenol-A content of this phase is less than about 1 part per million as determined by ultraviolet analysis.

The methylene chloride phase is separated from the aqueous phase, washed with an excess of dilute (0.01N) aqueous HCl and then washed three times with deionized water. The polymer is precipitated by steam and dried at 95° C. The resultant pure bisphenol-A polycarbonate is fed to an extruder operated at about 550° F. and the extrudate is comminuted into pellets.

The pellets are then molded into test bars measuring 5"×½"×⅛" thick and these test bars are subjected to test procedure UL-94.

EXAMPLE 4

This example illustrates a polycarbonate composition falling outside the scope of the instant invention in that the composition contains glass fibers but the polycarbonate contains no thiodiphenol.

To 900 grams of a powdered polycarbonate resin prepared substantially in accordance with the procedure of Example 3 are added 100 grams of glass fibers. This mixture is then thoroughly stirred and formed into test bars substantially in accordance with the procedure of Example 1. The test bars are then subjected to test procedure UL-94.

The following Example illustrates polycarbonate compositions falling within the scope of the instant invention.

EXAMPLE 5

Into a mixture of 1826.4 grams of bisphenol-A, 436.6 grams of 4,4'-thiodiphenol, 6 liters of water, 7 liters of methylene chloride, 31.1 grams of phenol, and 20.2 grams of triethylamine is introduced phosgene at the rate of 30 grams/minute for a period of 30 minutes, while maintaining the pH of the two phase system at about 11 by the simultaneous addition of an aqueous 25% sodium hydroxide solution. At the end of the phosgene addition the bisphenol-A content of the aqueous phase is less than about 1 part per million, as determined by ultraviolet analysis.

The methylene chloride phase is separated from the aqueous phase, washed with an excess of dilute (0.01N) HCl and is then washed three times with deionized water. The polymer is precipitated by steam and dried at 95° C. The resultant copolycarbonate has an intrinsic viscosity (IV) in methylene chloride at 25° C. of 0.533 dl/gm.

650 grams of this copolycarbonate, in powder form, are thoroughly mixed with 850 grams of a polycarbonate powder prepared substantially in accordance with the procedure of Example 3. The resultant polycarbonate blend contains about 8.67 mole percent of thiodiphenol residue. To this polycarbonate blend are added 166.6 grams of glass fibers. The resultant composition is then formed into test bars substantially in accordance with the procedure of Example 1 and the tests bars are subjected to test procedure UL-94.

Additionally, the compositions of Examples 3,4 and 5 are molded into test squares of about 2"×2"×¼" thick. Impact measurements by the notched Izod test were determined in accordance with ASTM D-1238. The results of these tests, as well as the UL-94 test, are set forth in Table I.

TABLE I

| Example No. | Mole % Thiodiphenol | Weight % Glass Fibers | Notched Izod (ft. lb.) | UL-94 |
| --- | --- | --- | --- | --- |
| 1 | 9 | 0 | — | V-II |
| 2 | 25 | 0 | — | V-O |
| 3 | 0 | 0 | 2.11 | Burns |
| 4 | 0 | 10 | 2.00 | Burns |
| 5 | 8.6 | 10 | 2.00 | V-O |

The following examples illustrate copolyester-carbonate compositions falling outside the scope of the instant invention. They are presented for comparative purposes only.

EXAMPLE 6

This example illustrates a prior art copolyester-carbonate resin which contains no thiodiphenol residues and no glass fibers admixed therewith.

Into a mixture of 2263 grams of bisphenol-A, 31.1 grams of phenol, 6 liters of water, 20.1 grams of triethylamine, and 7 liters of methylene chloride, brought to a pH of 11 by the addition of aqueous 25% sodium hydroxide solution, are slowly added 406 grams of isophthaloyl dichloride dissolved in 1 liter of methylene chloride. After addition of the acid chloride has ceased the mixture is stirred for 5 minutes and the pH is stabilized at about 11. Phosgene is then introduced into this mixture at the rate of 30 grams/minute for a period of 24 minutes. After phosgenation has ceased the two layers are separated, and the methylene chloride layer is washed with 0.01N HCl followed by two washings with deionized water. The polymer is precipitated with steam and dried at 95° C. The intrinsic viscosity of the polymer, determined at 25° C. in methylene chloride, is 0.53 dl/gm.

The resin is fed to an extruder operationg at about 600° F. and the extrudate is comminuted into pellets. The pellets are injection molded at about 620° F. into test bars measuring about 5"×½"×1/16" thick. These test bars are subjected to test procedure UL-94 and the results are set forth in Table II.

EXAMPLE 7

This example illustrates a copolyester-carbonate composition falling outside the scope of the instant invention in that while the composition does contain fibrous glass the copolyester-carbonate resin does not contain any thiodiphenol.

To 1500 grams of a copolyester-carbonate resin prepared substantially in accordance with the procedure of Example 6 are added 166.6 grams of glass fibers. The resultant mixture is thoroughly blended and is then formed into test bars substantially in accordance with the procedure set forth in Example 6.

These test bars are subjected to test procedure UL-94 and the results are tabulated in Table II.

The following example illustrates a copolyester-carbonate composition falling within the scope of the instant invention, i.e. one which contains the glass fibers and wherein the copolyester-carbonate resin contains the thiodiphenol residues.

EXAMPLE 8

A copolyester-carbonate resin containing thiodiphenol residues is prepared substantially in accordance with the procedure set forth in Example 6 except that the 2263 grams of bisphenol-A used in Example 6 are replaced with 1826.4 grams of bisphenol-A and 436.6 grams of 4,4'-thiodiphenol. The resultant copolyester-carbonate resin has an intrinsic viscosity at 25° C. in methylene chloride of 0.507 dl/gm.

To 650 grams of this thiodiphenol containing copolyester-carbonate resin, in powder form, are added 850 grams of a thiodiphenol-free copolyester-carbonate resin prepared substantially in accordance with the procedure set forth in Example 6. This resultant blend of copolyester-carbonate resins contains about 8.6 mole percent of thiodiphenol. To this powdered blend are added 166.6 grams of glass fibers. The resulting mixture is thoroughly mixed and formed into test bars substantially in accordance with the procedure set forth in Example 6.

These tests bars are subjected to test procedure UL-94, and the results are tabulated in Table II.

TABLE II

| Example No. | Mole % Thiodiphenol | Weight % Glass Fibers | UL-94 (1/16" thick bars) |
|---|---|---|---|
| 6 | 0 | 0 | Burns |
| 7 | 0 | 10 | Burns |
| 8 | 8.6 | 10 | V-O |

As illustrated by the data in Table I the instant polycarbonate compositions are flame retardant, non-dripping or drip-retardant, and exhibit good thick section impact. The flame retardant and non-dripping characteristics of the instant polycarbonate compositions are obtained using much lower concentrations of thiodiphenol than are required in prior art compositions to achieve comparable results. Thus, at similar concentrations of thiodiphenol but absent the glass fibers the prior art compositions of Example 1 are V-II. In order to have a V-O rating a polycarbonate composition which does not contain any glass fibers must contain relatively large amounts of thiodiphenol, e.g. the 25 mole % of Example 2. The presence of the glass fibers, without the thiodiphenol, as for example in Example 4, does nothing to improve the flame retardancy of the polycarbonate compositions.

However, as illustrated by the data for Example 5 the presence of the glass fibers renders polycarbonate compositions containing relatively minor concentrations of thiodiphenol flame retardant and non-dripping or drip-retardant. Thus, the instant polycarbonate compositions are flame retardant, drip-retardant, and exhibit good thick section impact. All of this is achieved using substantially smaller amounts of thiodiphenol than would be required to obtain the same results absent the glass fibers.

As illustrated by the data in Table II the instant copolyester-carbonate compositions are flame retardant and substantially non-dripping or drip-retardant. These properties are achieved using relatively minor amounts of thiodiphenol. Thus, the instant copolyester-carbonate compositions match quite closely the properties of substantially thiodiphenol, i.e. sulfur-free, copolyester-carbonate resins while simultaneously exhibiting flame retardant and drip-retardant properties.

As illustrated by the data of Example 7 the presence of glass fibers in a composition containing a thiodiphenol free copolyester carbonate resin is generally ineffective in improving the flame retardance of said compositions. However, as shown by the data for Example 8, the combination of the glass fibers with a copolyester-carbonate resin containing relatively minor amounts of thiodiphenol is quite effective in improving the flame retardancy and drip retardancy of the compositions.

Thus, the presence of the glass fibers in the amounts specified is critical in order to impart flame retardancy and drip-retardancy to compositions containing copolyester-carbonate resins or polycarbonate resins containing relatively small amounts of thiodiphenol.

Therefore, it is this combination of glass fibers and minor amounts of thiodiphenol which is effective in producing polycarbonate and copolyester-carbonate compositions which are flame retardant and drip-retardant.

It will thus be seen that the objects set forth above, among those made apparent from the preceding description, are efficiently attained, and since certain modifications may be made in carrying out the above processes and in the compositions set forth without departing from the scope of the invention, it is intended that all matters contained in the above description shall be inerperted as illustrative and not in a limiting sense.

What is claimed is:

1. Flame retardant and drip retardant halogen-free thermoplastic compositions comprised of, in physical admixture:
   (i) at least one halogen-free and sulfur containing thermoplastic resin derived from
      (a) at least one halogen-free, sulfur-free and non-polycyclic dihydric phenol,
      (b) from about 1 to about 15 mole percent, based on the total amount of said halogen-free, sulfur-free and non-polycyclic dihydric phenol and the halogen free thiodiphenol of at least one halogen-free thiodiphenol, and
      (c) a carbonate precursor; and
   (ii) from about 1 to about 50 weight percent, based on the total amount of said thermoplastic resin and fibrous glass present, of fibrous glass.

2. The compositions of claim 1 wherein said amount of fibrous glass is from about 5 to about 30 weight percent.

3. The compositions of claim 1 wherein said amount of said thiodiphenol is from about 2 to about 10 mole percent.

4. The compositions of claim 1 wherein said halogen-free, sulfur-free and non-polycyclic dihydric phenol is represented by the general formula

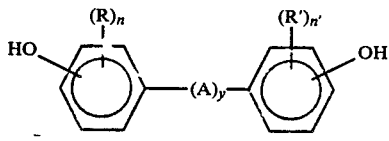

wherein:
A is selected from divalent hydrocarbon radicals, the —O— radical, and the

radical;
R is independently selected from monovalent hydrocarbon radicals;
R' is independently selected from monovalent hydrocarbon radicals;
y is either zero or one; and
n and n' are independently selected from whole numbers having a value of from 0 to 4 inclusive.

5. The compositions of claim 4 wherein said divalent hydrocarbon radicals are selected from alkylene, cycloalkylene, alkylidene, and cycloalkylidene radicals.

6. The compositions of claim 5 wherein said monovalent hydrocarbon radicals are selected from alkyl radicals, aryl radicals, cycloalkyl radicals, alkaryl radicals, and aralkyl radicals.

7. The compositions of claim 6 wherein said monovalent hydrocarbon radicals are selected from alkyl radicals.

8. The compositions of claim 6 wherein said divalent hydrocarbon radicals are selected from alkylidene radicals.

9. The compositions of claim 8 wherein said dihydric phenol is a 4,4'-bisphenol.

10. The compositions of claim 9 wherein said 4,4'-bisphenol is bisphenol-A.

11. The compositions of claim 1 wherein said halogen-free thiodiphenol is selected from thiodiphenols represented by the general formula

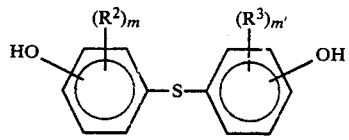

wherein:
R² is independently selected from monovalent hydrocarbon radicals;
R³ is independently selected from monovalent hydrocarbon radicals; and
m and m' are independently selected from whole numbers having a value of from 0 to 4 inclusive.

12. The compositions of claim 11 wherein said monovalent hydrocarbon radicals are selected from alkyl, cycloalkyl, aryl, alkaryl and aralkyl radicals.

13. The compositions of claim 12 wherein said monovalent hydrocarbon radicals are selected from alkyl radicals.

14. The compositions of claim 13 wherein said thiodiphenols are the 4,4'-thiodiphenols.

15. The compositions of claim 14 wherein said thiodiphenol is 4,4'-thiodiphenol.

16. The compositions of claim 14 wherein said halogen-free 4,4'-thiodiphenols are selected from the 2,2',6,6'-tetraalkyl-4,4'-thiodiphenols.

17. The compositions of claim 16 wherein said 2,2',6,6'-tetraalkyl-4,4'-thiodiphenol is 2,2',6,6'-tetramethyl-4,4'-thiodiphenol.

18. The compositions of claim 1 which further contain
   (iii) from about 20 to about 80 weight percent, based on the total amount of resin (i) and resin (iii) present of at least one halogen-free, sulfur-free thermoplastic resin derived from
      (a) at least one halogen-free, sulfur-free and non-polycyclic dihydric phenol, and
      (b) a carbonate precursor.

19. The compositions of claim 18 wherein said thermoplastic resin (i) is present from about 20 to about 80 weight percent, based on the total amounts of resin (i) and resin (iii) present.

20. The compositions of claim 18 wherein said halogen-free, sulfur-free and non-polycyclic dihydric phenol is represented by the general formula

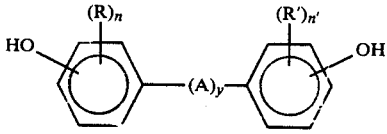

wherein:
A is selected from divalent hydrocarbon radicals, the —O— radical, and the

radical;

R is independently selected from monovalent hydrocarbon radicals;
R' is independently selected from monovalent hydrocarbon radicals;
y is either zero or one; and
n and n' are independently selected from whole numbers having a value of from 0 to 4 inclusive.

21. The compositions of claim 20 wherein said divalent hydrocarbon radicals are selected from alkylene radicals, cycloalkylene radicals, alkylidene radicals, and cycloalkylidene radicals.

22. The compositions of claim 21 wherein said monovalent hydrocarbon radicals are selected from alkyl radicals, cycloalkyl radicals, aryl radicals, aralkyl radicals, and alkaryl radicals.

23. The compositions of claim 22 wherein said monovalent hydrocarbon radicals are selected from alkyl radicals.

24. The compositions of claim 21 wherein said dihydric phenol is bisphenol-A.

25. The compositions of claim 24 wherein said carbonate precursor is phosgene.

26. The compositions of claim 1 wherein said halogen-free and sulfur-containing thermoplastic resin (i) is derived from (a), (b), (c) and (d) at least one difunctional carboxylic acid or a reactive derivative thereof.

27. The compositions of claim 26 wherein said difunctional carboxylic acid is selected from isophthalic acid, terephthalic acid, and mixtures thereof.

28. The compositions of claim 26 wherein said reactive derivatives of said difunctional carboxylic acid are the acid dihalides.

29. The compositions of claim 28 wherein said acid dihalides are selected from the acid dichlorides.

30. The compositions of claim 29 wherein said acid dichlorides are selected from isophthaloyl dichloride, terephthaloyl dichloride, and mixtures thereof.

31. The compositions of claim 26 wherein said halogen-free, sulfur-free and non-polycyclic dihydric phenol (a) is represented by the general formula

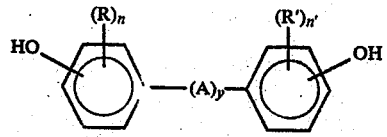

wherein:
A is selected from divalent hydrocarbon radicals, the —O— radical, and the

radical;
R is independently selected from monovalent hydrocarbon radicals;
R' is independently selected from monovalent hydrocarbon radicals;
y is either zero or one; and
n and n' are independently selected from whole numbers having a value of from 0 to 4 inclusive.

32. The compositions of claim 31 wherein said divalent hydrocarbon radicals are selected from alkylene radicals, cycloalkylene radicals, alkylidene radicals, and cycloalkylidene radicals.

33. The compositions of claim 32 wherein said monovalent hydrocarbon radicals are selected from alkyl radicals, cycloalkyl radicals, aryl radicals, aralkyl radicals, and alkaryl radicals.

34. The compositions of claim 33 wherein said monovalent hydrocarbon radicals are selected from alkyl radicals.

35. The compositions of claim 31 wherein said dihydric phenol is bisphenol-A.

36. The compositions of claim 31 wherein said thiodiphenol is selected from thiodiphenols represented by the general formula

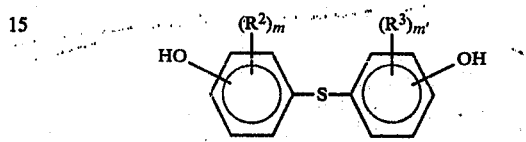

wherein:
$R^2$ is independently selected from monovalent hydrocarbon radicals;
$R^3$ is independently selected from monovalent hydrocarbon radicals; and
m and m' are independently selected from whole numbers having a value of from 0 to 4 inclusive.

37. The compositions of claim 36 wherein said monovalent hydrocarbon radicals are selected from alkyl radicals, cycloalkyl radicals, aryl radicals, aralkyl radicals, and alkaryl radicals.

38. The compositions of claim 37 wherein said monovalent hydrocarbon radicals are selected from alkyl radicals.

39. The compositions of claim 38 wherein said thiodiphenol is a 4,4'-thiodiphenol.

40. The compositions of claim 39 wherein said 4,4'-thiodiphenol is 4,4'-thiodiphenol.

41. The compositions of claim 39 wherein said 4,4'-thiodiphenols are selected from 2,2',6,6'-tetraalkyl-4,4'-thiodiphenols.

42. The compositions of claim 41 wherein said 2,2',6,6'-tetraalkyl-4,4'-thiodiphenol is 2,2',6,6'-tetramethylthiodiphenol.

43. The compositions of claim 26 which further contain (iv) at least one halogen-free and sulfur-free thermoplastic resin derived from
    (a) at least one halogen-free, sulfur-free and non-polycyclic dihydric phenol,
    (b) a carbonate precursor, and
    (c) at least one difunctional carboxylic acid or a reactive derivative thereof.

44. The compositions of claim 43 wherein said difunctional carboxylic acid is selected from terephthalic acid, isophthalic acid, and mixtures thereof.

45. The compositions of claim 43 wherein said reactive derivatives of said difunctional carboxylic acid are the acid halides.

46. The compositions of claim 45 wherein said acid halides are selected from the acid dichlorides.

47. The compositions of claim 46 wherein said acid dichlorides are selected from isophthaloyl dichloride, terephthaloyl dichloride, and mixtures thereof.

48. The compositions of claim 43 wherein said halogen-free, sulfur-free and non-polycycli dihydric phenol is represented by the general formula

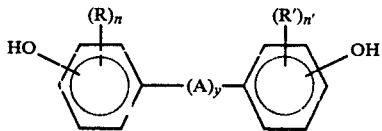

wherein:

A is selected from divalent hydrocarbon radicals, the —O— radical, and the

radical;

R is independently selected from monovalent hydrocarbon radicals;

R' is independently selected from monvalent hydrocarbon radicals;

y is either zero or one; and n and n' are independently selected from whole numbers having a value of from 0 to 4 inclusive.

49. The compositions of claim 48 wherein said divalent hydrocarbon radicals are selected from alkylene radicals, cycloalkylene radicals, alkylidene radicals, and cycloalkylidene radicals.

50. The compositions of claim 49 wherein said divalent hydrocarbon radicals are selected from alkyl, cycloalkyl, aryl, aralkyl and alkaryl radicals.

51. The compositions of claim 50 wherein said monovalent hydrocarbon radicals are selected from alkyl radicals.

52. The compositions of claim 51 wherein said halogen-free, sulfur-free and non-polycyclic dihydric phenols are selected from 4,4'-bisphenols.

53. The compositions of claim 52 wherein said 4,4'-bisphenol is bisphenol-A.

54. The compositions of claim 53 which contain from about 20 to about 80 weight percent of said halogen-free and sulfur-free thermoplastic resin (iv) and from about 80 to about 20 weight percent of said halogen-free and sulfur containing thermoplastic resin (i) derived from (a), (b), (c) and (d), based on the total amounts of said resins (iv) and (i) present.

* * * * *